US011962976B2

(12) United States Patent
Fischer et al.

(10) Patent No.: US 11,962,976 B2
(45) Date of Patent: Apr. 16, 2024

(54) METHOD FOR OPERATING A HEARING AID SYSTEM, AND HEARING AID SYSTEM WITH A HEARING AID

(71) Applicant: Sivantos Pte. Ltd., Singapore (SG)

(72) Inventors: Rosa-Linde Fischer, Erlangen (DE); Ronny Hannemann, Buckenhof (DE)

(73) Assignee: Sivantos Pte. Ltd., Singapore (SG)

( * ) Notice: Subject to any disclaimer, the term of this patent is extended or adjusted under 35 U.S.C. 154(b) by 183 days.

(21) Appl. No.: 17/725,746

(22) Filed: Apr. 21, 2022

(65) Prior Publication Data

US 2022/0345834 A1 Oct. 27, 2022

(30) Foreign Application Priority Data

Apr. 22, 2021 (DE) ..................... 10 2021 204 036.5

(51) Int. Cl.
*H04R 25/00* (2006.01)

(52) U.S. Cl.
CPC ......... *H04R 25/505* (2013.01); *H04R 25/552* (2013.01); *H04R 25/604* (2013.01); *H04R 2225/41* (2013.01)

(58) Field of Classification Search
None
See application file for complete search history.

(56) References Cited

U.S. PATENT DOCUMENTS

| | | | |
|---|---|---|---|
| 10,798,487 | B2 | 10/2020 | Hviid |
| 10,880,655 | B2 | 12/2020 | Kukla et al. |
| 2015/0010177 | A1 | 1/2015 | Kwon et al. |
| 2018/0233018 | A1 | 8/2018 | Burwinkel et al. |
| 2020/0138364 | A1 | 5/2020 | Fabry et al. |
| 2022/0248970 | A1 | 8/2022 | Burwinkel et al. |

FOREIGN PATENT DOCUMENTS

| | | | |
|---|---|---|---|
| DE | 102014109007 | A1 | 12/2015 |
| EP | 3585072 | A1 | 12/2019 |
| EP | 3900779 | A1 | 10/2021 |
| WO | 2020206155 | A1 | 10/2020 |

*Primary Examiner* — Kenny H Truong
(74) *Attorney, Agent, or Firm* — Laurence. A. Greenberg; Werner H. Stemer; Ralph E. Locher

(57) ABSTRACT

A hearing aid system has comprises a hearing aid with at least one input transducer, an output transducer, and a movement sensor. An actual movement of the hearing aid system user is detected as movement sensor data of the movement sensor and/or as movement sound data of the input transducer. An actual movement pattern for the actual movement is determined based on the movement sensor data and/or the movement sound data. The actual movement pattern is compared with a target movement pattern and, depending on the outcome of the comparison, an audio signal is generated at a perceptible signal level to supports the hearing aid system user in the execution of the actual movement. The movement sounds detected by the input transducer are used as the audio signal.

9 Claims, 3 Drawing Sheets

METHOD FOR OPERATING A HEARING AID SYSTEM, AND HEARING AID SYSTEM WITH A HEARING AID

CROSS-REFERENCE TO RELATED APPLICATION

This application claims the priority, under 35 U.S.C. § 119, of German Patent Application DE 10 2021 204 036.5, filed Apr. 22, 2021; the prior application is herewith incorporated by reference in its entirety.

FIELD AND BACKGROUND OF THE INVENTION

The invention relates to a method for operating a hearing aid system, which comprises a hearing aid with at least one microphone and one receiver, as well as a movement sensor. The invention also relates to a hearing aid system, in particular a hearing aid device, for carrying out the method.

Hearing aid devices are portable hearing devices that are used to provide care for deaf or hearing-impaired persons. In order to meet the numerous individual needs, different types of hearing aids are available, such as behind-the-ear hearing aids (BTE) and hearing aids with an external receiver (RIC: receiver in the canal) as well as in-the-ear hearing aids (ITE), including for example conchal hearing aids or channel hearing aids (CIC: Completely-in-Canal, IIC: Invisible-in-the-Canal). The hearing aids listed as examples are worn on the outer ear or in the auditory canal of a hearing aid user. In addition, bone conduction hearing aids, implantable hearing aids, or vibrotactile hearing aids are also available on the market. In these the stimulation of the damaged hearing takes place either mechanically or electrically.

Such hearing aids generally have an input transducer, an amplifier, and an output transducer as essential components. The input transducer is usually an acousto-electric transducer, such as a microphone, and/or an electromagnetic receiver, such as an induction coil or a (radio frequency, RF) antenna. The output transducer is usually implemented as an electro-acoustic transducer, for example as a miniature speaker (receiver), or as an electromechanical transducer, such as a bone conduction receiver. The amplifier is usually integrated into a signal processing device. The power supply is usually provided by a battery or a rechargeable battery.

In the case of a so-called binaural hearing aid device, two such hearing aids are worn by a user, with a communication link existing between the hearing aids. During operation, data, possibly even large amounts of data, are exchanged, for example wirelessly, between the hearing aids on the right and left ears. The data and information exchanged enable the hearing aids to be adapted particularly effectively to a particular acoustic ambient situation. In particular, this enables a particularly authentic spatial acoustics for the user and improves the intelligibility of speech, even in noisy environments.

As people age, there is an increasing risk of disease or comorbidities, in particular of the autonomic nervous system (ANS), such as hearing loss, dementia, or Parkinson's disease. In particular, more than one of these conditions often occur, so that, for example, people with Parkinson's typically also have a hearing impairment or hearing loss.

Many of these diseases and disorders also lead to a higher fall risk and eventually to fall events on the part of the affected person, which can lead to serious injuries. Psychological consequences or effects of fall events, such as episodes of anxiety after a fall, must also be taken into account. A fall can thus lead to a reduced quality of life and increased costs in the healthcare system.

In addition, a hearing impairment or hearing loss is associated with a reduced ability to perceive self-movement. This can lead, especially in combination with other diseases, to a reduced feeling of "safety" and thus to a vicious circle of decreasing physical activity, further decline in self-confidence, and an increased risk of falling. In addition, rehabilitation measures after falls and accompanying injuries are usually time-consuming, costly and often difficult to implement if the affected persons additionally suffer from hearing loss and age- or disease-related cognitive decline.

To reduce the risk of falling and/or as a rehabilitation measure, for example, sonification or sound generation can be used to support and improve the patient's self-movement. Sonification is understood here to mean in particular the use of non-speech audio signals in order to convey information or to perceive data. Auditory perception has advantages in terms of temporal, spatial, amplitude and frequency resolution, which opens up possibilities as an alternative or supplement to visualization techniques.

For example, a technique known as rhythmic auditory cueing is possible, which is defined as the application of repetitive, isochronous beats with the aim of synchronizing the motor-based execution of a movement with this rhythm. This is usually implemented in training sessions which are carried out on a treadmill, for example. In addition or alternatively, in special training sessions it is possible to provide a real-time "sonification" of movement parameters which are realized in acoustic feedback, for example, in order to render information about the length and force of a movement in audible form.

SUMMARY OF THE INVENTION

It is accordingly an object of the invention to provide a method and a device which overcome the above-mentioned disadvantages of the heretofore-known devices and methods of this general type and which provide for a particularly suitable method for operating a hearing aid system. In particular, in order to prevent or reduce a risk of falling, it is intended to provide simple and reliable support for self-movement that is preferably applicable in daily life. An additional object of the invention is to specify a hearing aid system that is particularly suitable for carrying out the method.

With the above and other objects in view there is provided, in accordance with the invention, a method for operating a hearing aid system, the hearing aid system including a hearing aid with at least one input transducer, an output transducer, and a movement sensor, the method comprising:

detecting an actual movement of a hearing aid system user as movement sensor data of the movement sensor and as movement sound data of the input transducer;

determining an actual movement pattern for the actual movement on a basis of at least one of the movement sensor data or the movement sound data;

comparing the actual movement pattern with a target movement pattern; and depending on the comparing step, generating an audio signal at a perceptible signal level by way of the output transducer, wherein the movement sound data acquired by the input transducer is used as the audio signal and the audio signal supports the hearing aid system user in an execution of the actual movement.

Where method steps are described in the following, advantageous configurations for the hearing aid system are obtained in particular by the fact that the latter is designed to execute one or more of these method steps.

The method according to the invention is intended for operating a hearing aid system, in particular a hearing aid device, and is also suitable and designed for this purpose. The hearing aid system has a hearing aid.

The hearing aid is used, in particular, for treating a hearing-impaired user (hearing aid system user). The hearing aid is designed to detect sound signals from the environment and to output them to a user of the hearing aid. For this purpose, the hearing aid has at least one acoustic-electric input transducer, in particular a microphone, as well as at least one electro-acoustic output transducer, for example a receiver. The input transducer captures sound signals (noises, tones, speech, etc.) from the environment during operation of the hearing aid and converts them into an electrical input signal (acoustic data). An electrical output signal is generated from the electrical input signal by modifying the input signal in a signal processor. The signal processor is part of the hearing aid, for example. The signal processing comprises, for example, an (output) amplifier for the (selective) amplification of the input signal or for setting a signal level of the output signal. The output transducer generates an acoustic sound signal from the output signal. The input transducer and the output transducer, as well as the signal processor if present, are housed in particular in a housing of the hearing aid. The housing is designed in such a way that it can be worn by the user on the head and near the ear, e.g. in the ear, on the ear, or behind the ear. The hearing aid is preferably designed as a BTE (behind-the-ear) hearing aid, an ITE (in-the-ear) hearing aid, or an RIC (receiver-in-canal) hearing aid.

The hearing aid can be binaural and for this purpose comprise two individual devices, each having at least one input transducer and at least one output transducer, and thus being designed to record sound signals from the environment and to output them to a user of the hearing aid. The method described below can be carried out in one of the individual devices or in both individual devices or by the two individual devices together.

For example, a wireless interface is provided for data exchange between the two individual devices. For example, the wireless interface is a Bluetooth interface or a WLAN interface or a MI interface (MI-Link, MI: Magnetic Induction). For example, the Bluetooth interface is a standard or a low-energy Bluetooth interface.

As an alternative to a binaural hearing aid however, a monaural hearing aid with only one individual device is also suitable. The statements relating to a monaural hearing aid are transferable mutatis mutandis to a binaural hearing aid and vice versa.

The hearing aid also has a movement sensor to capture movements of the hearing aid system user. The movement sensor is designed and configured to detect three-dimensional (body) movements or movement events, in particular translational and/or rotational movements. The movement sensor is formed, for example, as an accelerometer and/or a gyroscope, i.e., as a gyroscopic (position) sensor. Alternatively, the movement sensor can also be a pulse, blood pressure, or light sensor. A combination of accelerometer and/or gyroscope and/or pulse sensor and/or blood pressure sensor and/or light sensor is also possible. The movement sensor is preferably integrated in the hearing aid, in particular in its housing. In the case of a binaural hearing aid, preferably one movement sensor is integrated in each of the individual devices.

The conjunction "and/or" as used here and in the following is to be understood to mean that features linked by means of this conjunction can be implemented both jointly and as alternatives to each other. That is, the expression "A and/or B" represents A and B, or A, or B. Similarly, the expression "at least one of A or B" should be understood to mean A and B, or A, or B.

In the application case, the hearing aid is worn on the head and near the ear of the hearing aid system user, so that the movement sensor can be used to detect, in particular, head movements of the hearing aid user. In particular, walking movements, i.e., bodily movements due to walking or running, can be detected at least indirectly via the movement sensor of the hearing aid.

Here and in the following, a "movement" means an in particular translational and/or rotational body movement of the hearing aid system user, i.e., a movement action or a (temporal) sequence of movement actions (movement sequence).

The term "movement pattern" refers here and in the following in particular to a characterization of the respective (body) movement based on characteristic (movement) variables (movement parameters), which are determined, for example, on the basis of recorded data. For example, the movement pattern of a walking movement can be characterized by a step frequency, a step length, and a step synchrony. A "movement pattern" refers here in particular to a (temporal) signal sequence or a signal pattern or signal waveform of the recorded data, or the characteristic parameters derived from it, that characterizes the respective (bodily) movement.

In accordance with the method according to the invention, during the operation of the hearing aid system an actual movement of the hearing aid system user is detected as movement sensor data of the movement sensor and as movement sound data of the input transducer.

An "actual movement" of the hearing aid system user is to be understood in particular as self-movement (own bodily movement) of the hearing aid system user.

The term "movement sensor data" is to be understood here in particular to mean direction-dependent accelerations and/or rotations, which are detected by means of the movement sensor.

The term "movement sound data" is understood here to mean, in particular, acoustic signals in the signal (acoustic signal, acoustic data) detected by the input transducer, which can be directly or indirectly attributed to the bodily movement or self-movement of the hearing aid system user (movement sounds). The analysis or acquisition of the movement sounds or movement sound data from the input transducer data/signals (acoustic data) can be carried out by means of a movement sound classifier, for example. Such a classifier can be, for example, an artificial intelligence system or a neural network, in particular a deep neural network (DNN), which is appropriately trained with different movement sounds.

The movement sensor data and/or movement sound data are thus a measure of the bodily movements performed by the hearing aid system user. Based on the movement sensor data and/or the movement sound data, an actual movement pattern is determined for the actual movement. In other words, the actual movement, or the movement sensor data and/or the movement sound data, is analyzed during the execution of the actual movement, i.e., the actual movement being performed is characterized based on the acquired signal waveforms/signal patterns.

For example, a target movement pattern is determined for the hearing aid system user's movement detected by the hearing aid system. For example, a desired step frequency and/or step length or similar is determined for a walking movement at a certain walking speed. If the hearing aid system user suffers from an ANS disorder or illness (autonomic nervous system), the target movement pattern can also be, for example, an externally specified or stored movement pattern. Alternatively, the target movement pattern can also be a stored movement pattern of a previous movement by the hearing system user him/herself, which serves as an individual starting value (baseline), for example.

The actual movement pattern is compared with the target movement pattern, and depending on the comparison, an audio signal with a perceptible signal level is generated by means of the output transducer, which signal supports the hearing aid system user in the execution of the movement. In other words, deviations between the variables or movement parameters characterizing the movement are determined on the basis of the actual and target movement patterns, and depending on the result, a perceptible acoustic audio signal is output to the hearing aid system user in order to adapt the (actual) movement of the hearing aid system user to a desired (target) movement. The signal level of the audio signal is understood in particular to mean the volume of the acoustic audio signal. For example, the movement patterns or movement pattern deviations act as triggers for the audio signal. The audio signal acts as an acoustic movement feedback or an acoustic movement response signal, which helps the hearing aid system user to perceive their own movement and adapt it to a desired movement. As a result, a particularly suitable method for operating a hearing aid system is implemented. In particular, the hearing aid system is thus used to monitor and control the self-movement of the hearing aid system user.

The movement sensor in the hearing aid, which is worn to compensate for a hearing loss, is thus used according to the invention to monitor and support the movement patterns of the hearing aid wearer. A core idea of the invention thus consists, in particular, in detecting the movements of the hearing aid system user (e.g. walking, turning, etc.) by means of the hearing aid, and to analyze the detected movements and to compare them with a prescribed or desired movement and to provide the hearing aid system user with an acoustic signal for adapting or monitoring their movement. Using the movement analysis, for example, the current motion (walking) or the general movement is identified and compared with an ideal (target) movement pattern.

The provision of audible or perceptible audio signals during a movement may help the hearing aid system user to learn new movements or to optimize specific movements, which means performing a movement with an appropriate force or duration which is indicated to the hearing aid system user by means of acoustic aspects of the audio signal (volume, pitch, rhythm, et cetera).

The method improves the self-perceived movement of the hearing aid system user and extends it to allow its application in daily life. In particular, it is thus possible, for example, to use the hearing aid to implement rhythmic auditory cues or a movement sonification in order, for example, to increase the availability and intensity of motor rehabilitation without preventing the hearing aid system user from perceiving their environment and being responsive in daily life.

Acoustic feedback can be more accurate for a hearing aid system user than visual feedback, in particular, but not exclusively, for hearing aid system users with a hearing loss or hearing impairment. Thus, this design also offers advantages above and beyond applications for hearing-impaired users, in particular in the field of physical rehabilitation using applied sonification. In addition, it is known that sonification stimulates subcortical learning and is therefore superior to verbal and visual instructions in general, and in particular in the case of age- or disease-related cognitive impairments.

By using the method according to the invention, it is also not necessary for the hearing aid system user with an ANS disorder to carry an additional device. In other words, there is no additional burden due to using another device in addition to the hearing aid. This can thus also contribute to persuading only mildly hearing-impaired persons to use a hearing aid to improve their quality of life and to prevent injuries and/or to monitor their self-movement.

From a medical point of view, the method according to the invention contributes to safety, to reducing the risk of falling, to fewer injuries, and to lower costs in the healthcare system. The hearing aid system user acquires a better physical condition, which is expressed in optimal gait symmetry, safer walking speed, etc. This allows the hearing aid system user, for example, to retrain the step length and/or the synchronization of arms and legs and even to learn new complex movements that help them to lead an independent life of high quality.

From a neurological point of view, the method according to the invention offers advantages with regard to the multi-sensory integration of somatosensory and acoustic feedback on movement patterns in general and gait patterns in particular. Multi-sensory integration is a basis for learning in the brain, and thus a basis for re-learning safe walking and for compensating for the loss of self-perceived movement in hearing impairment due to the reduced acoustic feedback that accompanies hearing impairment.

In more general terms, the present invention has the potential to offer additional benefits of hearing aid systems beyond hearing itself. Therefore, people may be willing to use hearing aids even if they suffer from only a mild hearing impairment, because they receive additional (health-related) benefits. By extending the functionality of the hearing aid to reproduce acoustic feedback for a movement, the learning or re-learning of movements is not limited to specific training sessions, but can also take place in daily life. This increases the training frequency and duration compared to standard training sessions, so that a better learning outcome is achieved by the hearing aid system user.

Three applications or application cases, or combinations thereof, are preferably possible for the method according to the invention.

In a first application case, the hearing aid system essentially acts like a kind of pacemaker or metronome, i.e., as an extended feedback or response system, which generates an in particular rhythmic, acoustic feedback or a sonification of kinematic movement pattern parameters. This allows the hearing aid system user to align or synchronize their current (sub-optimal) movement pattern with the acoustically reproduced (ideal, optimal) movement pattern. For example, this reduces the risk of falling and improves the performance of the desired movement by the hearing aid system user.

In this application, the hearing system compares, preferably continuously, the current actual movement pattern and the target movement pattern, with the acoustic audio signal being set as closely as possible to an optimum value in each situation. For example, it is conceivable that the audio signal is only generated depending on the particular situation. In other words, a particular situation is classified, for example, and depending on the result, the acoustic feedback is either generated by means of the audio signal or not.

In a second application case, the method according to the invention is used, for example, to specifically amplify the travel or movement sounds, e.g. the sound of steps when walking, cycling, swimming in water, or other complex movements. This supports the processes of multi-sensory integration in the brain by somatosensory feedback from the respective sensor cells in the feet and the acoustic feedback of the movement sounds (for example, stepping sounds, arm or swimming sounds).

In a third application case, the method according to the invention is used for training purposes in order to learn from scratch or improve movements or motor skills (learning application). For example, the hearing aid system changes the "shape" of the audio signal to induce changes in the bodily movement of the hearing aid system user. A change in the bodily movement in this case is, for example, a change in the temporal movement sequence (timing), or in a (movement) force, or in other details of the movement action.

A desired application case is preferably specified at the start of the method. The target movement pattern is appropriately determined or selected depending on the respective application. In other words, the optimal movement pattern for the respective application is determined as the target movement pattern. For example, the desired step speed, step rhythm and step length are determined for a given walking style. The generated audio signal may vary depending on the selected application case.

The selection of the application or the specification of the target movement can take place, for example, during a fitting or fine-tuning of the hearing aid. Preferably, the target movement or the application case is specified via a user interface of an auxiliary device connected to the hearing aid for signal transmission.

The auxiliary device is preferably a mobile operating and display device, for example a mobile phone, in particular a mobile phone with a computer function or a smartphone, or else a tablet computer. The auxiliary device is suitably provided with a stored application software (operating software). The application software is preferably installed or can be installed on the operating and display device as a so-called app or mobile app (mobile application, smartphone app).

This embodiment is based on the consideration that modern operating and display devices, such as smartphones or tablet computers in particular, are widely used in modern society and are generally available and accessible to a user at all times. In particular, the user of the hearing aid system is highly likely to have such an operating and display device in his/her household.

Nowadays, modern smartphones are additionally equipped with a plurality of different near-field and far-field communication means as standard, which in principle makes it a simple matter to establish a communication or signal connection to the hearing aid. The application software is preferably also suitable and configured for setting operating parameters of the hearing aid, such as a sound volume. As a result, the user does not need an additional, separate operating system for monitoring and adjusting the hearing aid system, instead it is possible to use his/her existing smartphone to specify the target movement and analyze the movement data by (subsequently) downloading and/or installing the application software. In this way, user-side costs are advantageously reduced.

The surfaces of smartphones or tablet computers, which are typically implemented as touch screens (screen, display), also allow a particularly simple and intuitive operation of the application software of the auxiliary device thereby formed. This means a smartphone or tablet computer can be particularly cost-effectively retrofitted for monitoring the self-movement.

The operating and display device comprises an internal controller, at least the core of which is formed by a microcontroller with a processor and a data store, in which the functionality for carrying out the method is implemented as software in the form of the application software so that the method or the monitoring of the self-movement—possibly in interaction with the user—is carried out automatically when the application software is executed in the microcontroller.

Preferably, the actual movement pattern is determined both on the basis of the movement sensor data and the movement sound data. The movement sound data of the input transducer or the microphone are used to determine the movement quality, for example, its periodicity. For example, with regard to a walking movement, different step sounds from step to step may indicate a balance disorder. The deviation from a periodic (target) step sound can therefore be used as a measure for adjusting the audio signal. For example, during a swimming movement the duration of the individual strokes, and thus the corresponding duration of the movement sounds, may vary. The duration of the swimming stroke thus provides information which can be taken into account when generating the audio signal.

The audio signal generated according to the method has a perceptible signal level, which means that the audio signal has a signal level that is perceptible by the hearing aid system user in the acoustic signal generated by the output transducer. The acoustically generated signal is, for example, an amplified signal from the input transducer to supply a hearing-impaired hearing aid system user. The signal level of the audio signal can be adjusted by the hearing aid system user, for example, via a remote control or an auxiliary device. For example, it is conceivable that the signal level of the audio signal can be adjusted separately by the hearing aid system user.

The audio signal, which may be rhythmic, for example, is provided by the input transducer signal. In a binaural hearing aid the audio signal can be produced, for example, binaurally, monaurally, or monaurally in an alternating manner.

In one embodiment it is conceivable, for example, that a time frame or a schedule for carrying out the method can be specified, i.e., that the method is started at a specific time and terminated at another specific time. In this case it is possible, for example, that a hearing aid system user can define intervals at which, or how often, their self-movement should be checked and monitored or supported. It is also conceivable, for example, that a desired schedule is stored in the hearing aid system, for example a duration per hour, day, week, et cetera.

In a particularly suitable embodiment, the audio signal is generated for a specified duration when the deviation between the actual movement pattern and the target movement pattern reaches or exceeds a specified threshold value. This means that the audio signal is generated when the movement pattern indicates that there is a health or safety risk for the hearing aid system user.

For example, it is possible that the hearing aid system user can manually adjust, manipulate or change the volume of the audio signal, for example via an auxiliary device. It is also possible, for example, that the hearing aid system user can start, pause, and terminate the method manually.

In a preferred development of the method, a probability of a future deviation of the actual movement pattern from the target movement pattern of the hearing aid system user is determined on the basis of the acquired movement sensor data and/or movement sound data. For example, the probability is determined using a method as described in our commonly assigned patent application Ser. No. 17/520,900, filed Nov. 8, 2021 (a § 111 of international application PCT/EP2020/086518). The entire contents of the earlier applications are hereby incorporated by reference. Specific reference is had to claims 1 and 2 and the associated description on pages 8-14 of the international application.

The deviation of the actual movement pattern from the target movement pattern can be realized, for example, in the form of a fall or trip event, so that in particular a fall probability is determined as in the said specification Ser. No. 17/520,900 (PCT/EP2020/086518). In addition or alternatively, however, other deviations can be analogously predicted, wherein the audio signals generated in accordance with the method intervene in a supportive manner to reduce or prevent such a predicted deviation.

According to this development, the target movement pattern is adjusted based on the probability. In particular, the current target movement pattern is adjusted in such a way that the probability of a deviation or a fall or trip is reduced or minimized as far as possible. In other words, the target movement pattern is updated to reflect the current actual movement pattern, thus avoiding larger, unwanted, future deviations. For example, if the risk of falling is to be minimized by optimizing the gait/walking behavior, then for example, the required walking speed, the step synchrony and other patterns are determined and used as triggers for the audio signal. For example, a rhythm of the audio signal will be modified to reduce the risk of falling for the hearing aid system user or to maximize the safety of the hearing aid system user.

It is also conceivable, for example, that a threshold comparison of the probability is used as a trigger criterion for the movement monitoring/adjustment. For example, the audio signal is only generated when the probability reaches or exceeds a stored threshold value, i.e., when a sufficiently high risk of falling is present.

In a suitable design, a signal property, in particular the signal level, of the audio signal is adjusted on the basis of the determined probability. In other words, the signal level of the audio signal is modified as a measure for reducing the risk of falling or tripping. Alternatively, it is possible, for example, to modify a rhythm of the audio signal to reduce the risk of falling for the hearing aid system user or to maximize the safety of the hearing aid system user. It is also possible, for example, to change a “pitch” or frequency of the audio signal, for example statically or as a sweep (either ascending or descending).

In one conceivable embodiment, the audio signal is used as a sonification of the target movement pattern. In other words, the target movement pattern is expressed in sound, for example, a rhythmic audio signal is generated as a clock signal or trigger sound for a walking or swimming movement. In the case of a yoga movement, the target movement pattern or the audio signal can also be a measure or sonification for a desired breathing movement, in particular the audio signal can thus also be used to support meditation exercises. The sonification of the target movement pattern ensures that the hearing aid system user is supported in the execution of a desired target movement.

According to the invention, the movement sounds detected by the input transducer are used as the audio signal. This means that the movement sounds, i.e., the sounds or acoustic signals (movement sound data) caused by the self-movement, are detected by the input transducer and selectively amplified to generate the audio signal. For example, to support a walking movement, step sounds are amplified more strongly than other signals of the input transducer, so that the hearing aid system user can reliably perceive the step sounds. This improves the self-perceived movement of the hearing aid system user.

This means that a genuine or real movement sound is used as the audio signal. For this purpose, the input transducer signal (acoustic data) is analyzed and processed specifically with regard to the movement sound data. Depending on the application case, the processing can lead to increased audibility, adjustments of the frequency characteristic, the tonality, the duration, or others.

An additional or further aspect of the invention provides that the signal level of the audio signal is adjusted in proportion to a deviation between the target movement pattern and the actual movement pattern. In other words, the volume of the audio signal is adjusted depending on the result of the comparison. In particular, the signal level is reduced if the actual and target movement patterns match, and increased if the actual and target movement patterns differ. This makes the volume of the perceived audio signal act as additional acoustic feedback for the deviation from the desired movement execution.

In a convenient development, an ambient situation is determined based on the acoustic data of the input transducer, wherein a signal property or signal characteristic, in particular the signal level, of the audio signal is adjusted based on the determined ambient situation. The optimal output gain for the audio signal is thus adjusted based on the determined ambient situation. In addition or alternatively, a decision on the appropriateness of generating the audio signal can also be made based on the determined ambient situation. For example, the volume of the audio signal is increased in noisy environments, such as taking a walk along a busy road. It is also possible that the generation of the audio signal is paused or interrupted when, for example, a speech situation or a conversation involving the hearing aid system user is detected.

An ambient situation in this context is in particular an acoustic ambient situation or an auditory situation. The ambient situation is identified and described, for example, by means of situation detection and/or at least one level measurement and/or at least one algorithm of the hearing aid or the signal processing. For example, the ambient situation is classified according to specified criteria, and each of these classes is assigned a specific setting of the hearing aid parameters and/or hearing aid performance.

The signal level or volume of the audio signal is preferably always audible to the hearing aid system user. In order to achieve optimal audibility, the hearing aid analyzes the ambient level (internal level meter), takes into account, for example, the hearing loss of the hearing aid system wearer (audiogram information or derived from the hearing aid fitting), and ensures audibility, in particular by automatically adjusting the output gain of the audio signal. Relative changes in the audibility of the audio signal can be used to indicate different “qualities” of movement sequences. For example, the relative level of a step sound can indicate different step sizes or left-right asymmetries. In this example, the optimum for the user would be achieved if all the audio signals were displayed at the same level. In another example, the frequency characteristic or pitch of the audio signal can indicate the length of a swimming stroke. The aim of the hearing aid system user in this case would be to obtain the correct pitch, which indicates an optimal stroke length.

In an advantageous design, the actual and/or the target movement pattern is/are stored in a memory. This makes it possible, for example, to record and monitor progress or changes in the movement patterns. This data can be made available, for example, to medical experts and/or the hearing aid system user, for example by visualization on an external auxiliary device. Additionally or alternatively, it is possible, for example, to use the stored movement patterns to derive changes in the risk of falling or tripping and to evaluate the movement quality of the supported self-movement.

The hearing aid system according to the invention is designed in particular as a hearing aid device and comprises a hearing aid. The hearing aid has at least one input transducer for receiving an acoustic ambient signal, and an output transducer for outputting an acoustic signal, as well as a movement sensor for capturing a bodily movement of a hearing aid system user.

The hearing aid system also has a controller, i.e., a control unit. For example, the controller is integrated into the hearing aid and is part of a signal processor, for example. In addition or alternatively, it is also conceivable that the controller is part of an auxiliary device, in particular a smartphone, connected or coupled to the hearing aid for signal transmission.

The controller in this case is generally configured—in software and/or circuit technology—for carrying out the method according to the invention described above. The controller is thus specifically configured to analyze or characterize a user movement or movement event and to generate a signal that supports the movement.

In a preferred embodiment, the controller, at least in essence, is formed by a microcontroller with a processor and a data store, in which the functionality for carrying out the method according to the invention is implemented as software in the form of operating software (firmware), so that the method—possibly in interaction with a hearing aid system user—is carried out automatically when the application software is executed in the microcontroller. As an alternative within the scope of the invention, the controller can also be formed by a non-programmable electronic component, such as an application-specific integrated circuit (ASIC), in which the functionality for carrying out the method according to the invention is implemented in circuit technology.

Other features which are considered as characteristic for the invention are set forth in the appended claims. It will be understood that the advantages and embodiments mentioned in relation to the method are also applicable mutatis mutandis to the hearing aid system and vice versa.

Although the invention is illustrated and described herein as embodied in a method for operating a hearing aid system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Equivalent and identical parts and dimensions are provided with identical reference signs throughout the figures.

DETAILED DESCRIPTION OF THE INVENTION

Figure 1:
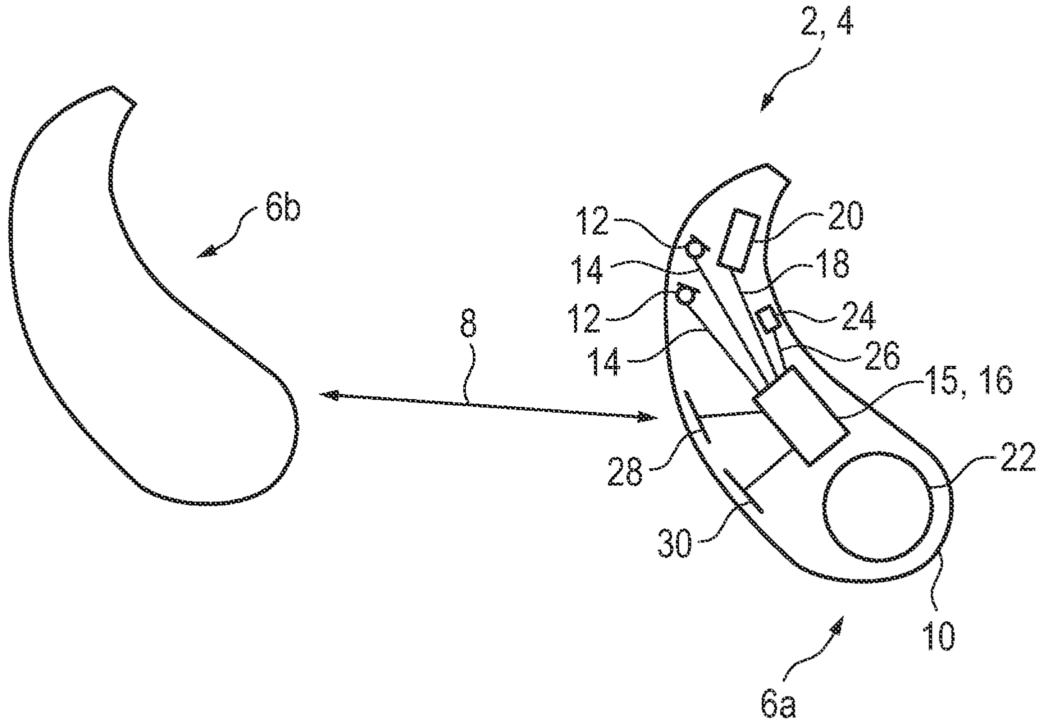
FIG. 1 shows a hearing aid system with a binaural hearing aid.

Referring now to the figures of the drawing in detail and first, in particular, to FIG. 1 thereof, there is shown the basic structure of a hearing aid system 2 according to the invention. In this exemplary embodiment, the hearing aid system 2 is designed as a hearing aid device with a binaural hearing aid 4 with two hearing aid devices or individual devices 6*a*, 6*b* coupled together for signal transmission. The individual devices 6*a*, 6*b* are designed, for example, as behind-the-ear hearing aids (BTE). The individual devices 6*a*, 6*b* are or can be coupled to each other for signal transmission via a wireless communication link 8.

For example, the communication link 8 is an inductive coupling between the individual devices 6*a* and 6*b*, or alternatively the communication link 8 is implemented for example as a radio link, in particular as a Bluetooth or RFID link, between the individual devices 6*a* and 6*b*.

The design of the individual devices 6*a*, 6*b* is explained below using the individual device 6*a* as an example. As shown schematically in FIG. 1, the individual device 6*a* comprises a device housing 10 in which one or more microphones, also referred to as acousto-electric input transducers 12, are installed. Via the input transducers 12, a sound or the acoustic signals in an environment of the hearing aid system 2 are detected and converted into electrical acoustic data 14.

The acoustic data 14 is processed by a controller 15 of a signal processing device 16 which is also arranged in the device housing 10. Using the acoustic data 14, the signal processing device 16 generates an output signal 18 which is routed to a loudspeaker or receiver 20. The receiver 20 here is designed as an electro-acoustic output transducer 20, which converts the electrical output signal 18 into an acoustic signal and outputs it. In the case of the BTE individual device 6*a*, the acoustic signal is transmitted to the eardrum of a hearing aid system user via a sound tube or external receiver, not shown in detail, which is connected to an earmold fitted in the ear canal. However, an electro-mechanical output transducer is also conceivable as the receiver 20, as in a bone conduction receiver, for example.

The power supply of the individual device 6*a* and in particular of the signal processing device 16 is provided by means of a battery 22 accommodated in the device housing 10.

The signal processing device 16 is coupled with a movement sensor 24 of the individual device 6*a*. The movement sensor 24 acquires acceleration and/or rotation movements of the individual device 6*a* during operation and sends them to the signal processing device 16 as movement sensor data 26 during operation. For example, the movement sensor 24 is designed as a 3D acceleration sensor. In addition or alternatively, the movement sensor 24 is designed as a position sensor, in particular as a gyroscopic sensor.

Figure 2:
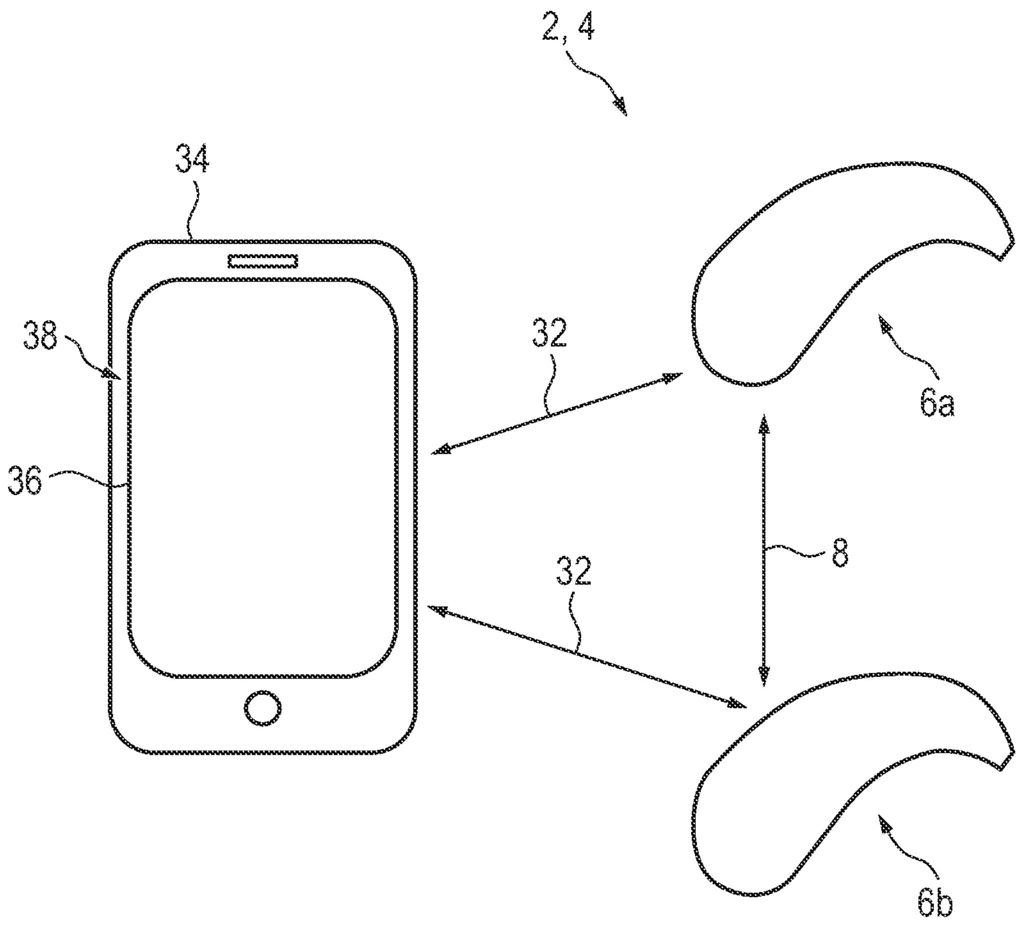
FIG. 2 shows the hearing aid system according to FIG. 1, in which the hearing aid is connected to a mobile auxiliary device for signal transmission.

The signal processing device 16 is also connected for signal transmission to a first transceiver 28 and to a second transceiver 30 of the individual device 6*a*. The transceiver 28 is used to transmit and receive wireless signals via the communication link 8 and the transceiver 30 is used to transmit and receive wireless signals using a communication link 32 to a hearing-aid-external auxiliary device 34 (FIG. 2). For example, it is also conceivable that only a single transceiver is provided for both communication links 8, 32.

In the exemplary embodiment of FIG. 2, the auxiliary device 34 is designed as a separate mobile operating and display device, which is or can be coupled to hearing aid 4 for signal transmission via the communication link 32. The auxiliary device 34 shown schematically in FIG. 2 is, in particular, a smartphone. The auxiliary device 34, also referred to hereafter as a smartphone, has a touch-sensitive display unit (display) 36, which is also referred to hereafter as a touch screen. The smartphone 34 is conveniently introduced into the transmission range of the communication link 32. The coupling for signal transmission between the smartphone 34 and the transceivers 30 of the individual devices 6*a* and 6*b* is carried out via an appropriate integrated transceiver, not specified in detail, for example a radio antenna, of the smartphone 34.

The smartphone 34 has an integrated controller which is essentially formed by a microcontroller with an application software 38 implemented for the software-based evaluation of signals and data transmitted by means of the communication link 32. The application software 38 is preferably a mobile app or a smartphone app, which is stored in a data memory of the controller. During operation, the controller displays the application software 38 on the display unit 36, which is designed as a touch screen, wherein the application software 38 can be operated by a hearing aid system user using the touch-sensitive surface of the display unit 36.

Figure 3:
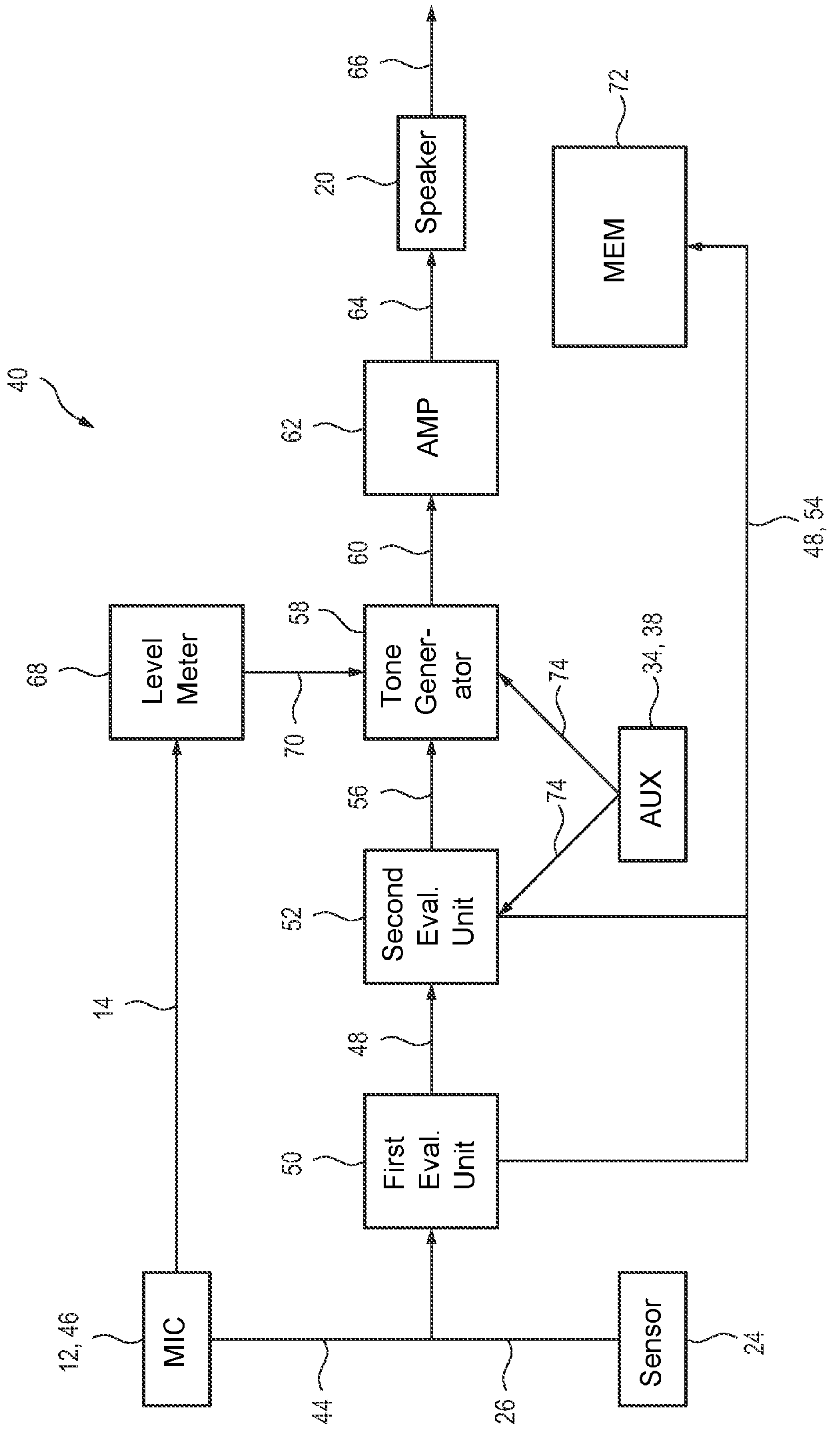
FIG. 3 shows a flowchart of a method for operating the hearing aid system.

Using the flowchart shown in FIG. 3, a method 40 according to the invention for operating the hearing aid 2 is explained in more detail in the following.

During the operation of the hearing aid system 2, an actual movement of the hearing aid system user is detected as movement sensor data 26 of the movement sensor 24 and as movement sound data 44 of the input transducer 12. The analysis or acquisition of the movement sounds or movement sound data 44 from the acoustic data 14 can be carried out, for example, using a movement sound classifier 46 of the controller 15. In FIG. 3, the classifier 46 is part of the input transducer 12, for example, but the classifier 46 can also be designed separately from the input transducer 12.

An actual movement pattern 48 is determined for the actual movement or self-movement of the hearing aid system user on the basis of the movement sensor data 26 and the movement sound data 44. The analysis of the movement sensor data 26 and the movement sound data 44, or the determination of the actual movement pattern 48 derived from it, is carried out, for example, by means of a classifier or a (first) evaluation unit 50 of the controller 15. Based on the movement of the hearing aid system user characterized by the actual movement pattern 48, a (second) evaluation unit 52 of the controller 15 is used to determine a target movement pattern 54. The evaluation unit 52 compares the actual movement pattern 48 with the target movement pattern 54, wherein a control signal 56 for a tone generator 58 is generated on the basis of the comparison. The tone generator 58 generates an electrical signal 60, which is amplified by means of an amplifier 62 and sent as an amplified signal 64 to the output transducer 20, which converts the signal 64 into a perceptible audio signal 66.

The audio signal 66 or the signals 60 and 64 can be a sonification of the target movement pattern 54. The audio signal 66, which is in particular rhythmic, in the form of a clock signal or trigger sound, for example, supports a walking movement of the hearing aid system user.

The signal level or volume of the audio signal 66 is preferably always audible to the hearing aid system user. In order to achieve optimal audibility, the controller 15 analyzes the ambient level, which is obtained from the acoustic data 14 of the input transducer 12, using a level meter or an environment classifier 68. In addition, for example, a hearing loss or hearing impairment of the hearing aid system user (audiogram information or derived from the hearing aid fitting) is taken into account, and a signal level signal 70 is generated. The signal level signal 70 in this case sets a signal level of the audio signal 66. To this end, in the exemplary embodiment shown in FIG. 3, for example, the signal level of the signal 60 is adjusted, so that the signal level of the audio signal 66 is varied as a result. Alternatively, the signal level signal 70 can also be used to adjust the amplifier or the signal 64.

The actual and/or the target movement patterns 48, 54 are stored in a memory 72 of the controller 15. This makes it possible, for example, to record and monitor progress or changes in the movement patterns 48, 54. This data can be made available, for example, to medical experts and/or the hearing aid system user, for example by visualization on the display unit 36 of the auxiliary device 34.

Preferably, an application case 74 is transmitted to the hearing aid 4 by means of the auxiliary device 34 or by means of the application software 38. Depending on the selected application case 74, for example, the evaluation unit 52 and the tone generator 58 are activated, thereby changing the target movement pattern 54 and/or the audio signal 66.

In an embodiment not shown in detail, the controller 15 uses the acquired movement sensor data 26 and/or movement sound data 44 to determine a probability of a future fall or trip event affecting the hearing aid system user. The probability can be determined in this case, for example, in the evaluation unit 50.

Preferably, the target movement pattern 56 is adjusted depending on the determined probability. In particular, the target movement pattern 56 or the audio signal 66 is adjusted in such a way that the probability of a fall or trip is reduced or minimized as far as possible. For example, a rhythm of the audio signal 66 is modified to reduce the risk of falling for the hearing aid system user. For example, the signal level of the signal 60 or the audio signal 66 is adjusted based on the determined probability.

During operation, the individual devices 6*a*, 6*b* of the binaural hearing aid 4 output the audio signal 66, for example, synchronously with each other. For example, it is possible that the same audio signal 66 is output at different volume levels (depending on a hearing loss of the hearing aid system user and/or depending on the actual-to-target movement deviation) at the same time.

It is also possible, for example, that the same audio signal 66 is generated at different times, for example, the individual device worn on the left ear generates the audio signal 66 during a forward step with the left foot, while the individual device worn on the right ear generates the audio signal 66 analogously during a forward step with the right foot.

In particular, if the balance is impaired or if movement is impaired on one side (e.g. limping with one leg), it is also possible that the individual devices 6*a*, 6*b* generate different audio signals 66 or differently manipulated audio signals 66 for the right and left ear.

The movement sounds detected by the input transducer 12 will be used as the audio signal 66. This means that the movement sounds or the movement sound data 44 are specifically amplified for generating the audio signal 66 in the tone generator 58. The tone generator 58 can influence a signal property of the movement sound data 44, such as a signal level, a rhythm, or a frequency range of the movement sound data 44. Alternatively, the tone generator 58 can also be omitted, and the amplifier 62 can be used directly.

For example, to support a walking movement, step sounds are amplified more strongly than other signals of the acoustic data 14, so that the hearing aid system user can reliably perceive the step sounds. The signal level of the audio signal 66 in this case is set, for example, depending on the deviation of the actual movement pattern 48 from the target movement pattern 54.

The claimed invention is not limited to the exemplary embodiments described above. Instead, other variants of the invention can also be derived from them by the person skilled in the art, without departing from the subject matter of the claimed invention. In particular, all individual features described in connection with the various exemplary embodiments within the disclosed claims can also be combined together in different ways without departing from the subject matter of the invention.

The following is a summary list of reference numerals and the corresponding structure used in the above description of the invention:

2 hearing aid system
4 hearing aid
6*a*, 6*b* individual device
8 communication link
10 device housing
12 input transducer
14 acoustic data
15 controller
16 signal processing unit
18 output signal
20 output transducer
22 battery
24 movement sensor
26 movement data
28, 30 transceiver
32 communication link
34 auxiliary device/smartphone
36 display unit
38 application software
40 method
44 movement sound data
46 movement sound classifier
48 actual movement pattern
50 evaluation unit
52 evaluation unit
54 target movement pattern
56 control signal
58 tone generator
60 signal
62 amplifier
64 signal
66 audio signal
68 level meter/environment classifier
70 signal level signal
72 memory

The invention claimed is:

1. A method for operating a hearing aid system, the hearing aid system including a hearing aid with at least one input transducer, an output transducer, and a movement sensor, the method comprising:

detecting an actual movement of a hearing aid system user as movement sensor data of the movement sensor and as movement sound data of the input transducer;

determining an actual movement pattern for the actual movement on a basis of at least one of the movement sensor data or the movement sound data;

comparing the actual movement pattern with a target movement pattern; and depending on the comparing step, generating an audio signal at a perceptible signal level by way of the output transducer, wherein the movement sound data acquired by the input transducer is used as the audio signal and the audio signal supports the hearing aid system user in an execution of the actual movement.

2. The method according to claim 1, which comprises determining, on a basis of the detected movement sensor data and/or movement sound data, a probability of a future deviation of the actual movement pattern from the target movement pattern of the hearing aid system user, and adjusting the target movement pattern on the basis of the probability.

3. The method according to claim 2, which comprises adjusting the signal level of the audio signal according to the determined probability.

4. The method according to claim 1, which comprises determining the movement sound data from acoustic data of the input transducer.

5. The method according to claim 1, which comprises setting the signal level of the audio signal proportionally to a deviation between the target movement pattern and the actual movement pattern.

6. The method according to claim 1, which comprises determining an ambient situation of the hearing aid system user on a basis of the acoustic data of the input transducer, and setting the signal level of the audio signal based on the ambient situation.

7. The method according to claim 1, which comprises storing at least one of the actual movement pattern or the target movement pattern in a memory.

8. A hearing aid system, comprising:

a hearing aid with at least one input transducer for receiving an acoustic ambient signal, with an output transducer for outputting an acoustic signal, with a movement sensor for detecting a movement of a hearing aid system user, and with a controller configured for carrying out the method according to claim 1.

9. The hearing aid system according to claim 1, wherein the hearing aid is a binaural hearing aid.

* * * * *